Figure 1:
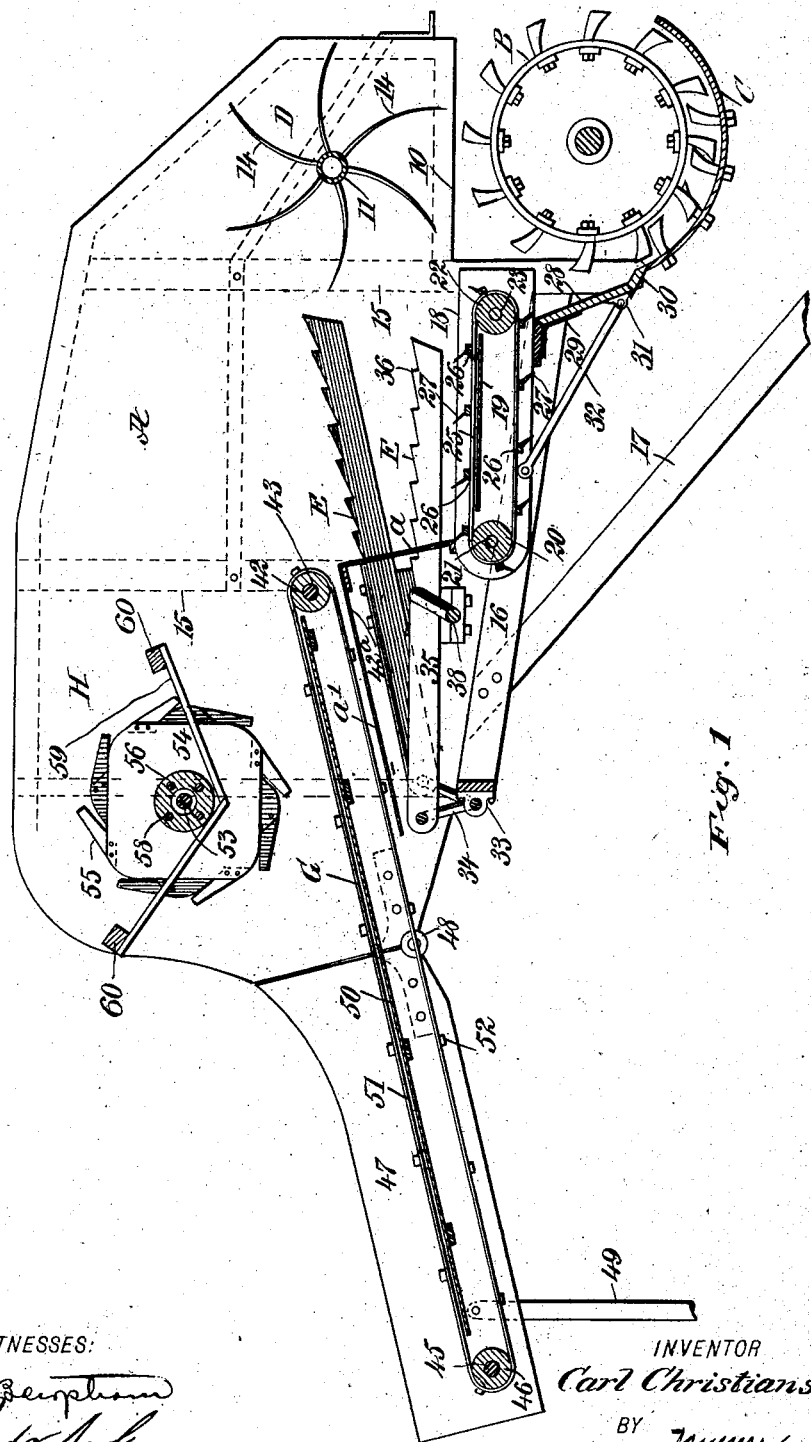

No. 751,260. PATENTED FEB. 2, 1904.
C. CHRISTIANSEN.
BAND CUTTER AND FEEDER FOR THRESHING MACHINES.
APPLICATION FILED DEC. 31, 1902.
NO MODEL. 2 SHEETS—SHEET 1.

WITNESSES:
INVENTOR
Carl Christiansen
BY
ATTORNEYS.

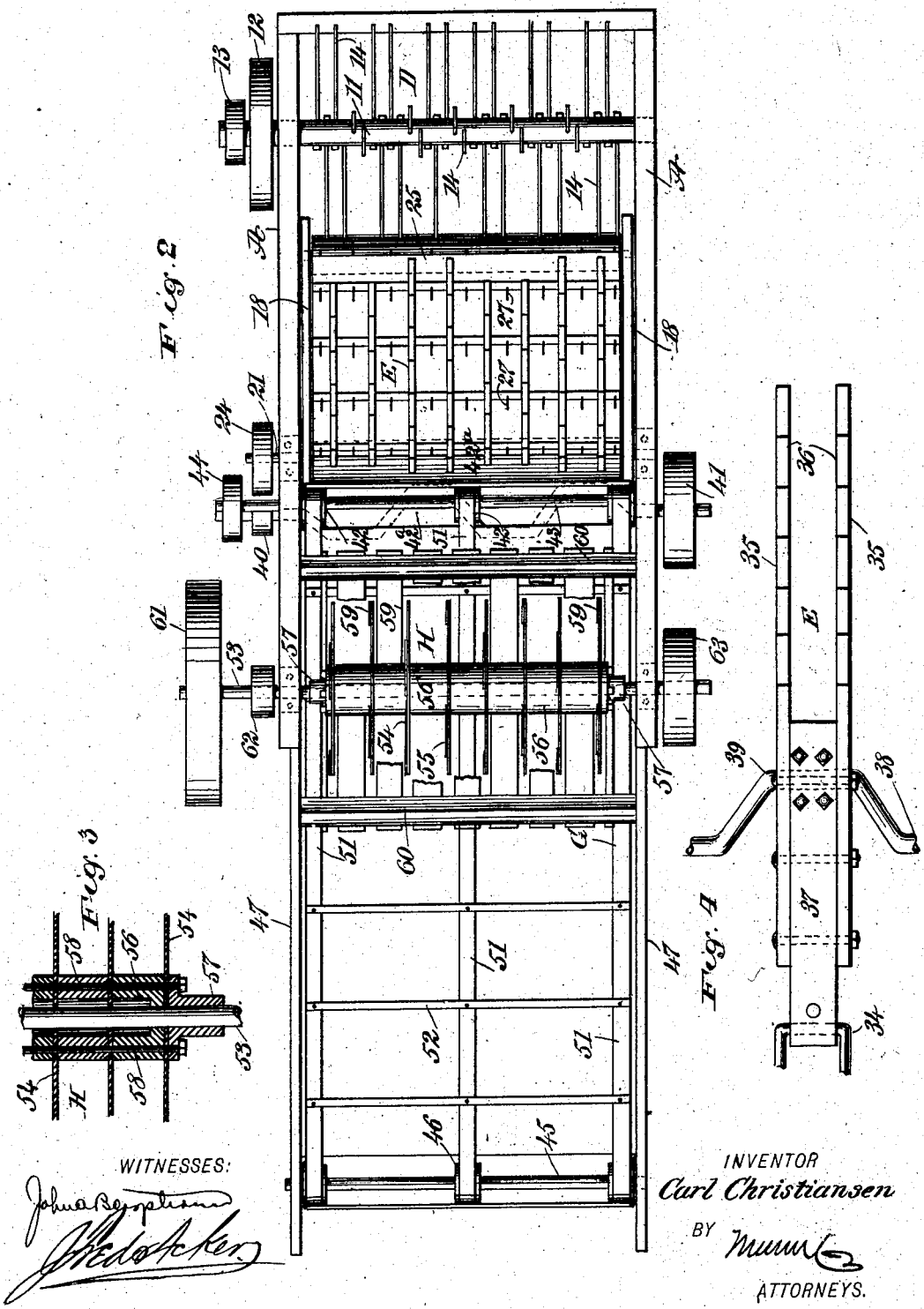

No. 751,260. Patented February 2, 1904.

UNITED STATES PATENT OFFICE.

CARL CHRISTIANSEN, OF CROOKSTON, MINNESOTA.

BAND-CUTTER AND FEEDER FOR THRESHING-MACHINES.

SPECIFICATION forming part of Letters Patent No. 751,260, dated February 2, 1904.

Application filed December 31, 1902. Serial No. 137,328. (No model.)

*To all whom it may concern:*

Be it known that I, CARL CHRISTIANSEN, a citizen of the United States, and a resident of Crookston, in the county of Polk and State of Minnesota, have invented a new and Improved Band-Cutter and Feeder for Threshing-Machines, of which the following is a full, clear, and exact description.

My invention relates to a band-cutter and self-feeding attachment for threshing-machines; and the purpose of the invention is to provide a simple construction of band-cutter which will positively separate the bands of all bundles presented to the cutters, and, further, to provide shakers acting in conjunction with the bundle-carrier which will thoroughly shake the bundles and spread the straw before it is delivered to the cylinder and concave.

Another purpose of the invention is to provide an even feed for the grain and a feed which will deliver the grain high up on the cylinder, and, furthermore, to so construct the conveyer member of the feed mechanism that it may be readily dropped to afford convenient access to the cylinder.

The invention consists of the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a central vertical section through the concave and cylinder and the band-cutting and feeding attachment. Fig. 2 is a plan view of the parts shown in Fig. 1, the cylinder being omitted. Fig. 3 is a longitudinal horizontal section through a portion of the band-cutting attachment, and Fig. 4 is a plan view of one of the shaking devices.

A represents the main cheek-pieces for the framework of the attachment, and these cheek-pieces are adapted to be attached to a threshing-machine in such manner that recesses 10, produced at the lower rearward portion of the cheek-pieces, will be over the cylinder B, which, as usual, is accompanied by a concave C.

Just above the recesses 10 in the cheek-pieces A a shaft 11, preferably tubular, is mounted to turn in the said cheek-pieces, the shaft being centrally located over the shaft of the cylinder B, as is shown in Fig. 1. At the right-hand end of the said shaft 11, which constitutes a portion of the retarding device D, a large and a small pulley 12 and 13 are secured, as is shown in Fig. 2, and on the said shaft 11, between the said cheek-pieces, series of retarding-fingers 14 are bolted or otherwise secured. These fingers are alternately arranged and are curved from the said shaft, as is best shown in Fig. 1. The retarding-fingers 14 are so curved that the concaved surfaces of the lower fingers will face the receiving end of the device, as is also shown in Fig. 1. As this retarding device D reaches above the cylinder B, it serves to scatter the straw and to prevent it from crowding up on the cylinder B, thus preventing slugging.

The cheek-pieces A are provided with suitable uprights 15, secured to their outer faces, and the forward uprights extend down below the lower edges of the cheek-pieces and practically form a portion of the threshing-machine adjacent to the receiving-surface of the cylinder B. Lower side sills 16 extend from the lower portions of the forward uprights 15 in direction of the receiving end of the attachment, and the sills are supported, preferably, at an upward and rearward inclination by braces 17. At the front of the said cylinder B a conveyer is located, which conducts the loose kernels of grain and the straw to the cylinder, and the said conveyer in its normal position, which is shown in Fig. 1, is so placed that the material carried by the conveyer is delivered to the upper portion of the cylinder as far as possible, thus enabling the cylinder to be operated with less power than ordinary. The conveyer consists of two side pieces 18, connected by a suitable table 19, which stops short of the ends of the side pieces, as is also shown in Fig. 1, and rollers 20 are secured on a shaft 21 at the receiving end of the conveyer. The said shaft 21 extends loosely through the said side pieces 18 of the conveyer-frame and through the cheek-sections A of the main frame of the attachment. At the opposite end of the said conveyer-frame corresponding rollers 22 are secured upon a shaft 23; but this shaft 23 extends only through the side members 18 of the conveyer-frame, and at the right-hand end of the shaft 21 a pulley 24 is secured, as is illustrated in Fig. 2. An endless belt or apron 25 is carried over the rollers 20 and 22 above and below the table 19, as is also shown in Fig. 1, and transverse slats 26 are secured to the outer face of the conveyer belt or apron. These slats 26 carry pins 27, which incline upwardly and forwardly or in direction of the receiving end of the attachment. These pins 27 also serve in a measure to retard the straw carried by the conveyer and to be delivered to the cylinder B. One end of the conveyer is thus not supported; but the other or receiving end of the conveyer is mounted to turn on the shaft 21 and is supported thereby. Therefore in order to provide a support for said other end of the conveyer an angular feed-board 28 is provided, and this feed-board consists practically of an upper section attached to the frame of the conveyer and a central or intermediate section hinged to the upper section, the lower end of which when the conveyer is in its normal or horizontal position rests upon the feed-board grate 30 of the concave C, as is shown in Fig. 1. This feed-board prevents the possibility of any material being spilled and serves to direct the material to the space between the concave and the cylinder. At the bottom rear portion of the said feed-board 28 lugs 31 are provided, and the forward ends of links 32 are removably attached to the said lugs, the links 32 at their upper ends being pivotally attached to the side pieces 18 of the conveyer-frame. Thus when it is desired to have convenient access to the cylinder the links 32 are disconnected from the lugs 31 and the forward end of the conveyer will thereupon drop downward and the feed-board can be folded out of the way, as the hinge 29 for the upper members of the feed-board is located at the rear side thereof.

A cross-bar is located at the front ends of the sills 16, and on the said cross-bar eyes or bearings 33 are secured, which carry links 34, and these links are pivotally connected with the front ends of shaking devices E. These shakers E are arranged side by side above the conveyer just described, as is shown in Fig. 1. Each shaker E, as is illustrated in Fig. 4, consists of parallel side members 35, having teeth 36 in their upper edges inclined upwardly and rearwardly, and these parallel side members 35 are connected at their rear portions by an interposed block 37, the blocks extending beyond the rear of the side or toothed members 35. In the front ends of the blocks 37 the links 34 are pivoted. These shakers E are mounted between their ends on the crank-arms 39 of a crank-shaft 38, the crank-arms of the crank-shaft extending in opposite directions, so that when one shaker is in an upper position the adjacent shaker will be in a lower position, and the said shakers while the crank-shaft 38 is in motion are given a reciprocating rotary motion, with a decided forward throw, thus tending to toss up the straw received by them and to deliver the straw well shaken to the upper portion of the cylinder B. This crank-shaft 38 is provided with a pulley 40 at its right-hand end and with a second pulley 41 at its left-hand end.

The cheek pieces or sections A of the main frame of the attachment are provided with rear extensions 47, hinged to the main portions A at their lower edges, so that the extension-sections 47 of the cheek-pieces A can fold down out of the way when desired, and when these extension-sections are in use they are held in position with a downward and outward inclination by means of suitable legs 49.

A bundle-carrier G extends from the outer end portions of the extensions 47 of the main frame upwardly and rearwardly to a point above the shakers E, the rearward end of the said bundle-carrier terminating about centrally between the ends of the shakers, as is shown in Fig. 1. This bundle-carrier consists of forward rollers 42, secured on a shaft 43, which shaft extends through the sides of the main frame of the attachment, and the shaft 43 is provided at its right-hand end with a pulley 44. A second shaft 45 is journaled in the outer end portion of the extensions 47 of the main frame, and this shaft 45 carries rollers 46, corresponding to the rollers 42. A table 50 in two sections is located between the rollers 42 and 46, one section of the table being attached to the cheek-pieces A of the main frame, while the other section of the table is attached to the extensions 47 of the said frame. Endless belts 51 are passed over the said rollers 42 and 46, and the said endless belts are connected by suitable transverse slats 52.

In order that the material delivered to the shakers E by the bundle-carrier G shall not be lost in the spaces between the said shakers, angular shields $42^a$ are located between said shakers, each shield consisting of a substantially vertical member $a$, secured to the frame of the conveyer, and an upper member $a'$, which extends forwardly below the lower stretches of the belts 51 in parallelism with said belts, as is clearly shown in Fig. 1.

The band-cutting device H is shown in Figs. 1, 2, and 3 and consists of a shaft 53, which is journaled in the cheek-sections A of the main frame at a point above the bundle-carrier G. A series of plates 54 is mounted on the said shaft 53, the said plates being substantially rectangular in formation; but their corners are rounded off. At each corner portion of each plate 54 a knife 55 is secured, extending beyond the edges of the plates with more or less of a curvature or inclination in a forward direction, as is particularly shown in Fig. 1, and the cutting edges of these blades or knives 55 are preferably serrated. The plates 54, carrying the knives 55, are held separated at desired intervals apart by sleeves 56, usually of wood, although they may be of metal, which sleeves fit loosely over the shaft 53, as is shown in Fig. 3, and caps 57 are secured on the shaft 53, bearing against the outer edges of the end sleeves 56. These sleeves and the plates are held rigidly in position by bolts 58, which are passed through the caps 57 and through the sleeves and the plates, the bolts being provided with nuts at both ends or with a head at one end and a nut at the opposite end. In order that the cutting mechanism shall not become bound or ineffective by reason of cord or rope being carried up and wound around the said sleeves or the band-cutter knives and shaft, fenders 59 are employed, extending downward from upper cross-bars 60 diagonally in direction of each other, converging at their lower ends, where they meet below the band-cutter shaft. These fenders 59 are close to the knives 55 as the said knives pass upward and forward. The fenders 59 serve to cause any cord or binding material that may possibly cling to the knives to be cut between the knives and the fenders.

The band-cutting shaft 53 is preferably provided with a driving-pulley 61 and a second pulley 62 at one end and with a third pulley 63 at its opposite end. The various pulleys may be belted together, so as to drive the several shafts carrying them, in any approved manner.

I desire it to be understood that the band-cutting knives 55 are so arranged that the knives on one plate 54 will be opposite the spaces between the knives on an adjacent plate, as is illustrated in Fig. 1.

This attachment is exceedingly simple. It is well adapted for the purpose intended, and can be expeditiously and conveniently applied to any threshing-machine.

Having thus described my invention, I claim as new and desire to secure by Letters Patent—

1. In a band-cutting and feeding attachment for threshing-machines, a bundle-carrier, shaking devices mounted for rotary reciprocating movement beneath the delivery end of the bundle-carrier and extending beyond the said end, the said shaking devices each comprising parallel side members having teeth in their upper edges inclined in direction of the delivery end of the attachment, the said parallel side members being connected at their rear portions by an interposed block, shields located between the shaking devices, a conveyer located beneath the said shaking devices, said conveyer being provided with teeth on its belt inclined in direction of the receiving end of the attachment, means for pivotally supporting the receiving end of the conveyer, a device for supporting the delivery end of the conveyer, and a bearing for one end of the said supporting device, the said supporting device being constructed in hinged sections so that it may be readily disengaged from its bearing, permitting the delivery end of the conveyer to drop, as set forth.

2. In a band-cutting and feeding attachment for threshing-machines, a conveyer, a bundle-carrier, and shaking devices located between the conveyer and the bundle-carrier, and arranged side by side, the said shaking devices each comprising parallel side members having teeth in their upper edges, and an interposed block connecting the parallel side members and extending beyond one end of said side members, a cross-bar held below the projecting ends of the said blocks and provided with bearings, links carried by said bearings and pivotally connected with the projecting ends of said blocks, shields located between the shaking devices and means for actuating the shaking devices, as set forth.

3. In a band-cutting and feeding attachment, the combination with the concave and cylinder of a threshing-machine, of a conveyer pivotally mounted at its receiving end, and a support for the delivery end of the conveyer constructed in hinged sections, the upper portion of the support being attached to the frame of the conveyer and the lower portion being adapted to rest on the receiving edge of the concave, lugs on the said support at the bottom rear portion thereof, and links pivoted at their upper rear ends to the side pieces of the conveyer-frame and removably attached at their forward ends to the said lugs, whereby the said support may be folded, thus permitting the delivery end of the conveyer to drop, as described.

4. In a band-cutting and feeding attachment for threshing-machines, the combination with the cylinder and the concave of such machine, of a conveyer, a pivotal support for the receiving end of the conveyer, a feed-board constructed in hinged sections and attached to the delivery end of the conveyer, means for supporting the lower portion of the feed-board at the upper receiving edge of the concave, and braces pivotally attached to the said conveyer and detachably connected with the said feed-board, whereby the feed-board may be folded and the delivery end of the conveyer dropped to afford ready access to the cylinder, as specified.

5. The combination with the cylinder and concave of a threshing-machine, of a bundle-carrier, a band-cutter, shaking devices mounted for rotary reciprocating movement beneath the delivery end of the bundle-carrier, angular shields located between the shaking devices and each consisting of a substantially vertical member and an upper member extending beneath the rear end of the bundle-carrier, an endless conveyer located beneath the shaking devices and arranged to deliver the material to the upper portion of the cylinder, and a retarding device mounted to revolve above the cylinder, as described.

In testimony whereof I have signed my name to this specification in the presence of two subscribing witnesses.

CARL CHRISTIANSEN.

Witnesses:
   A. P. HANSON,
   OLE CHRISTIANSEN.